United States Patent
He et al.

(10) Patent No.: US 11,473,564 B2
(45) Date of Patent: Oct. 18, 2022

(54) SYSTEM AND METHOD FOR MONITORING A WIND TURBINE PITCH BEARING

(71) Applicant: General Electric Company, Schenectady, NY (US)

(72) Inventors: Lijun He, Schenectady, NY (US); Liwei Hao, Niskayuna, NY (US); John Mihok, Schenectady, NY (US)

(73) Assignee: General Electric Company, Schenectady, NY (US)

(*) Notice: Subject to any disclaimer, the term of this patent is extended or adjusted under 35 U.S.C. 154(b) by 199 days.

(21) Appl. No.: 15/874,124

(22) Filed: Jan. 18, 2018

(65) Prior Publication Data
US 2019/0219032 A1 Jul. 18, 2019

(51) Int. Cl.
*G01M 13/04* (2019.01)
*F03D 17/00* (2016.01)
*F03D 80/50* (2016.01)
*F03D 7/02* (2006.01)
*F03D 80/70* (2016.01)

(52) U.S. Cl.
CPC ........... *F03D 17/00* (2016.05); *F03D 7/0224* (2013.01); *F03D 80/50* (2016.05); *F03D 80/70* (2016.05); *G01M 13/04* (2013.01); *F05B 2260/79* (2013.01); *F05B 2260/80* (2013.01)

(58) Field of Classification Search
CPC ....................................... F03D 17/00
USPC ....................................... 73/865.9
See application file for complete search history.

(56) References Cited

U.S. PATENT DOCUMENTS

| | | | |
|---|---|---|---|
| 4,237,454 A | 12/1980 | Meyer | |
| 5,955,880 A * | 9/1999 | Beam | F16C 17/246 324/207.17 |
| 8,043,048 B2 | 10/2011 | Daniels et al. | |

(Continued)

FOREIGN PATENT DOCUMENTS

| | | |
|---|---|---|
| CN | 202547923 U | 11/2012 |
| CN | 102889175 B | 11/2016 |

(Continued)

OTHER PUBLICATIONS

Yang et al., Wind Turbine Condition Monitoring and Fault Diagnosis Using Both Mechanical and Electrical Signatures, IEEE/ASME International Conference on Advanced Intelligent Mechatronics, Jul. 2-5, 2008. (Abstract Only).

(Continued)

Primary Examiner — Walter L Lindsay, Jr.
Assistant Examiner — Philipmarcus T Fadul
(74) Attorney, Agent, or Firm — Dority & Manning, P.A.

(57) ABSTRACT

A system and method for monitoring a pitch system of a wind turbine includes monitoring, via one or more first sensors, at least one electrical condition of the pitch system. The method also includes monitoring, via one or more second sensors, at least one mechanical condition of the pitch system. Further, the method includes receiving, via a controller communicatively coupled to the one or more first and second sensors, sensor signals representing the at least one electrical condition and the at least one mechanical condition of the pitch system. Thus, the method includes determining, via the controller, a bearing condition of a pitch bearing of the pitch system based on the at least one electrical condition and the at least one mechanical condition of the pitch system.

12 Claims, 11 Drawing Sheets

(56) References Cited

U.S. PATENT DOCUMENTS

| | | |
|---|---|---|
| 8,994,359 B2 | 3/2015 | Neti et al. |
| 2010/0219987 A1 | 9/2010 | Isom et al. |
| 2011/0018727 A1 | 1/2011 | Bharadwaj et al. |
| 2011/0020122 A1 | 1/2011 | Parthasarathy et al. |
| 2011/0158805 A1 | 6/2011 | Miranda et al. |
| 2011/0224917 A1 | 9/2011 | Uluyol et al. |
| 2013/0049733 A1 | 2/2013 | Neti et al. |
| 2013/0338938 A1 | 12/2013 | Coultate |
| 2014/0172326 A1 | 6/2014 | Zhang et al. |
| 2015/0369698 A1 | 12/2015 | Sakaguchi et al. |
| 2017/0328349 A1* | 11/2017 | Pan ................. F03D 17/00 |
| 2019/0048849 A1* | 2/2019 | Grunnet ............. F03D 7/042 |

FOREIGN PATENT DOCUMENTS

| | | |
|---|---|---|
| CN | 107 448 362 A | 12/2017 |
| DE | 10 2008 046357 A1 | 3/2010 |
| DE | 10 2016 210755 A1 | 12/2017 |
| EP | 262683 B1 | 7/2014 |
| WO | WO2012066107 A2 | 5/2012 |
| WO | WO 2017/137050 A1 | 8/2017 |

OTHER PUBLICATIONS

Kandukuri et al., Fault Diagnostics for Electrically Operated Pitch Systems in Offshore Wind Turbines, Journal of Physics, vol. 753, 2016, 14 Pages.
Lu et al., A Review of Recent Advances in Wind Turbine Condition Monitoring and Fault Diagnosis, Power Electronics and Machines in Wind Applications, Jun. 24-26, 2009. (Abstract Only).
Gong et al., "Bearing Fault Detection for Direct-Drive Wind Turbines via Stator Current Spectrum Analysis", Energy Conversion Congress and Exposition (ECCE), Sep. 17-22, 2011, pp. 313-318.
Nielsen et al., "Analysis of pitch system data for condition monitoring", Wind Energy, vol. 17, Issue: 3, Mar. 2014, pp. 435-449.
EP Search Report, dated Jun. 5, 2019.
First Examination Report for India Application No. 201844043674, dated Apr. 12, 2022.

* cited by examiner

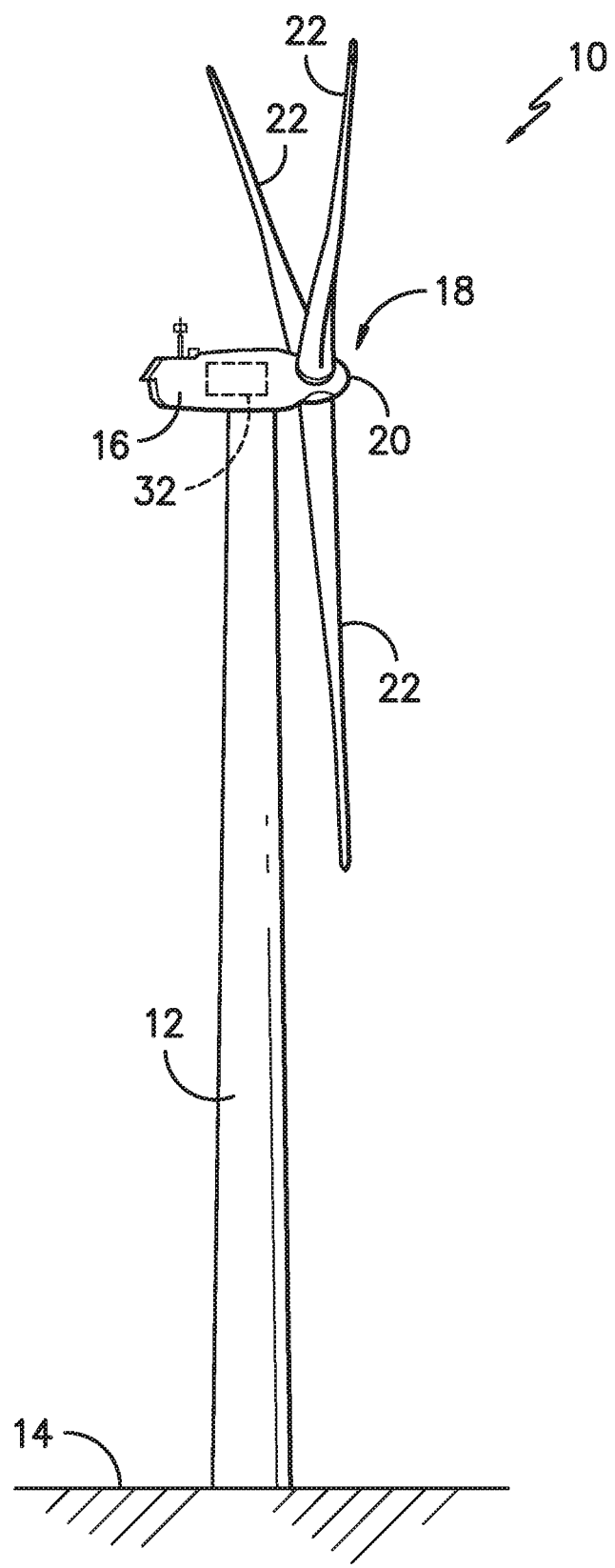
FIG. -1-

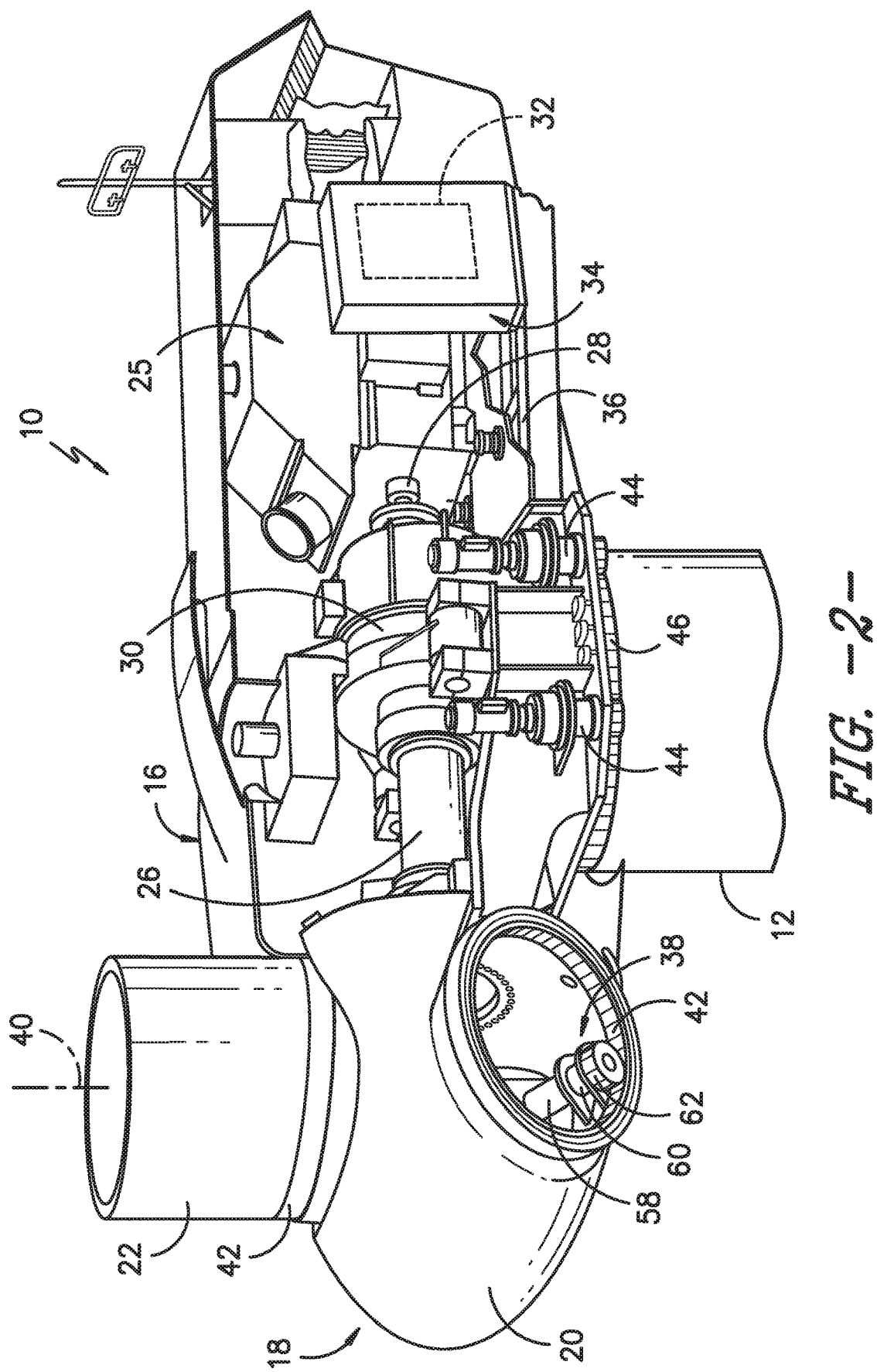
FIG. -2-

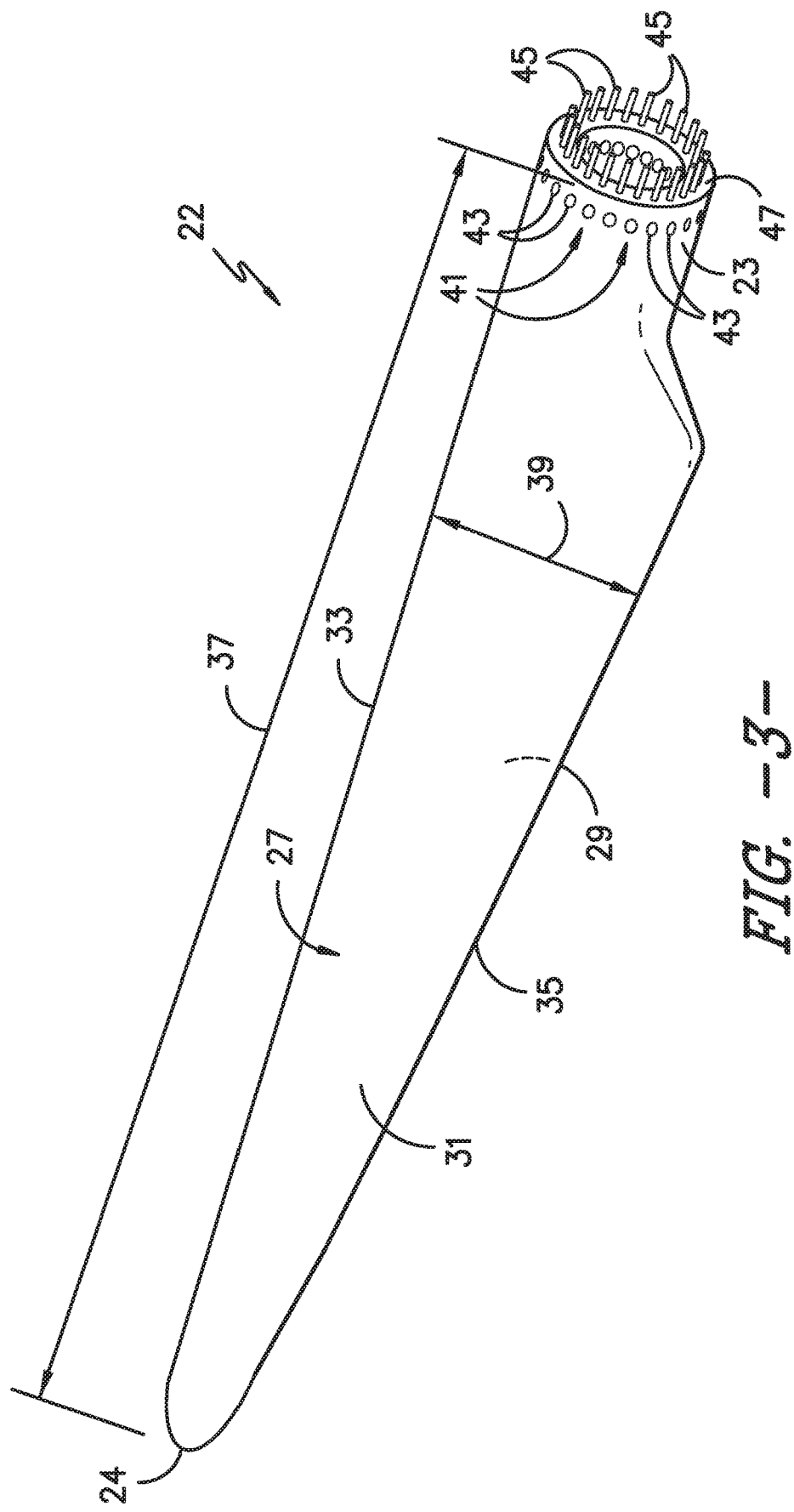
FIG. -3-

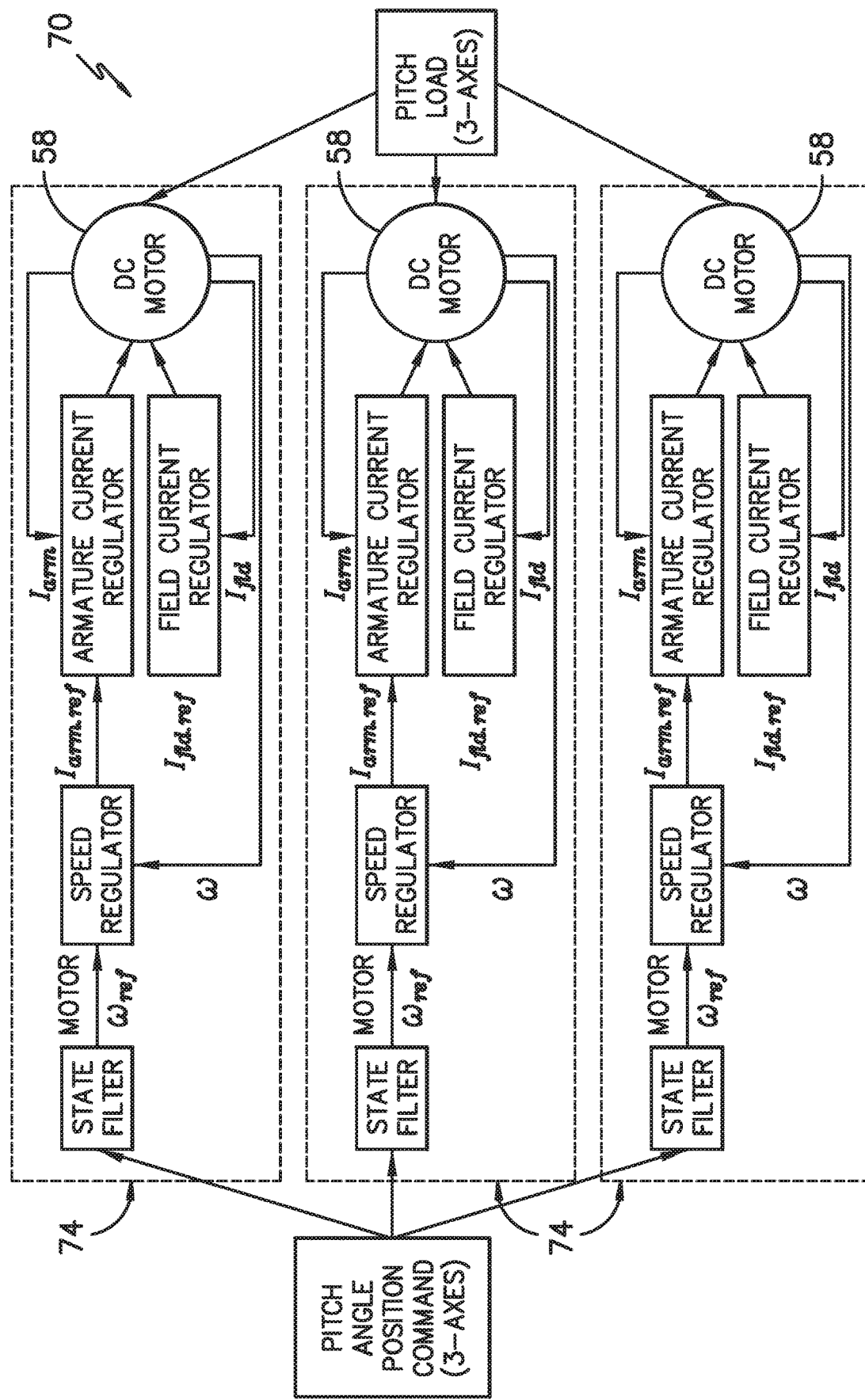
FIG. -4-

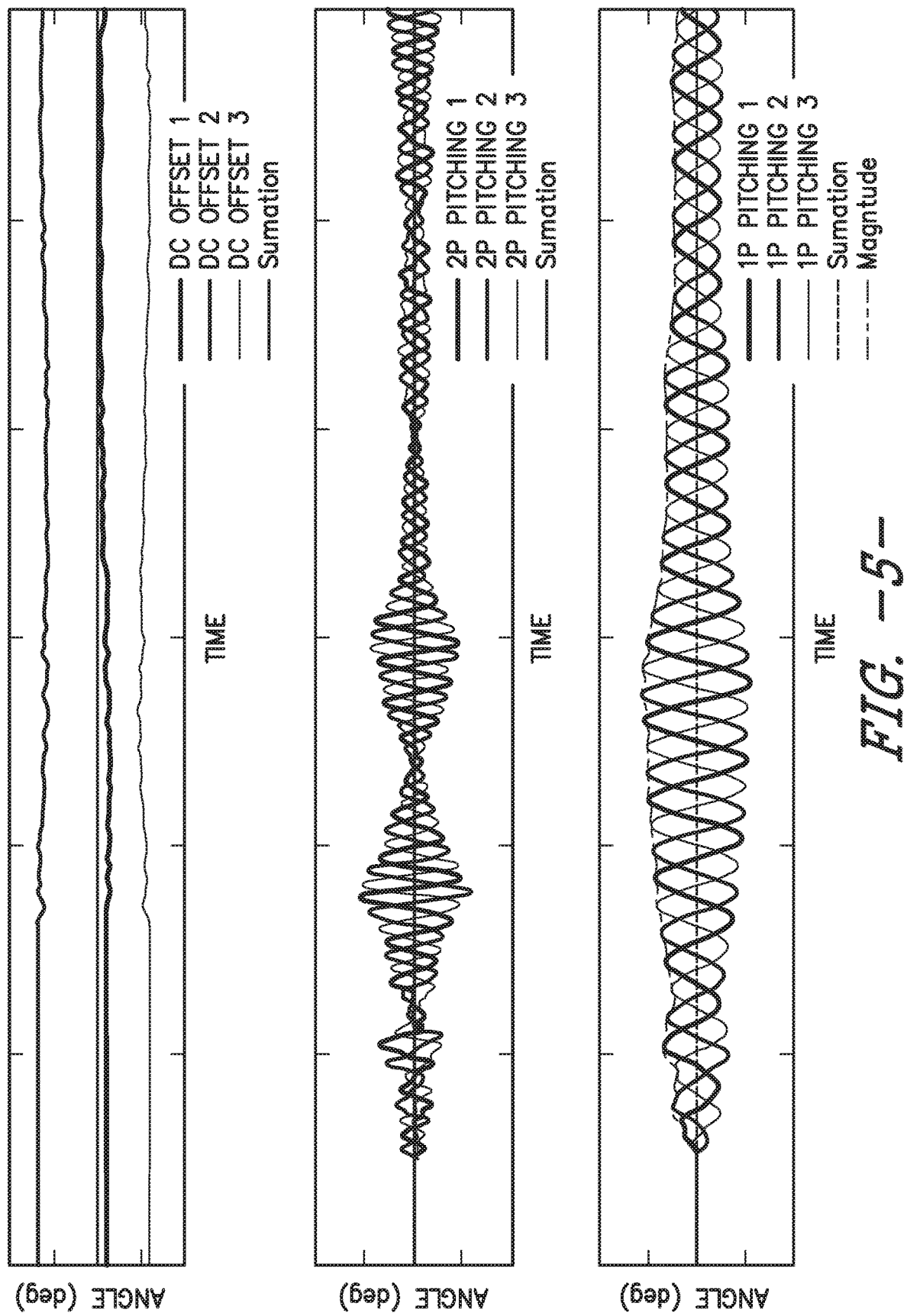
FIG. -5-

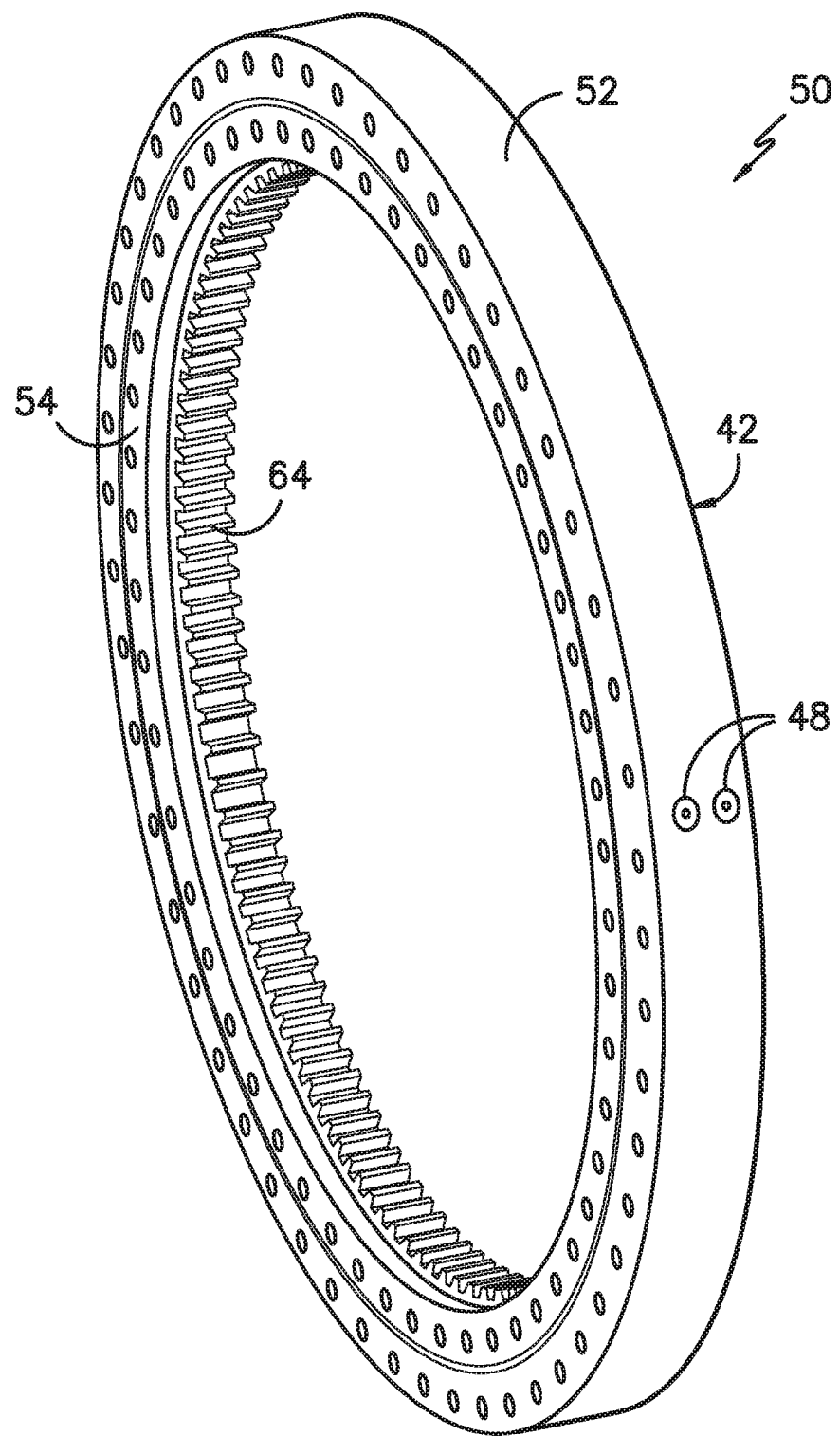
FIG. -6-

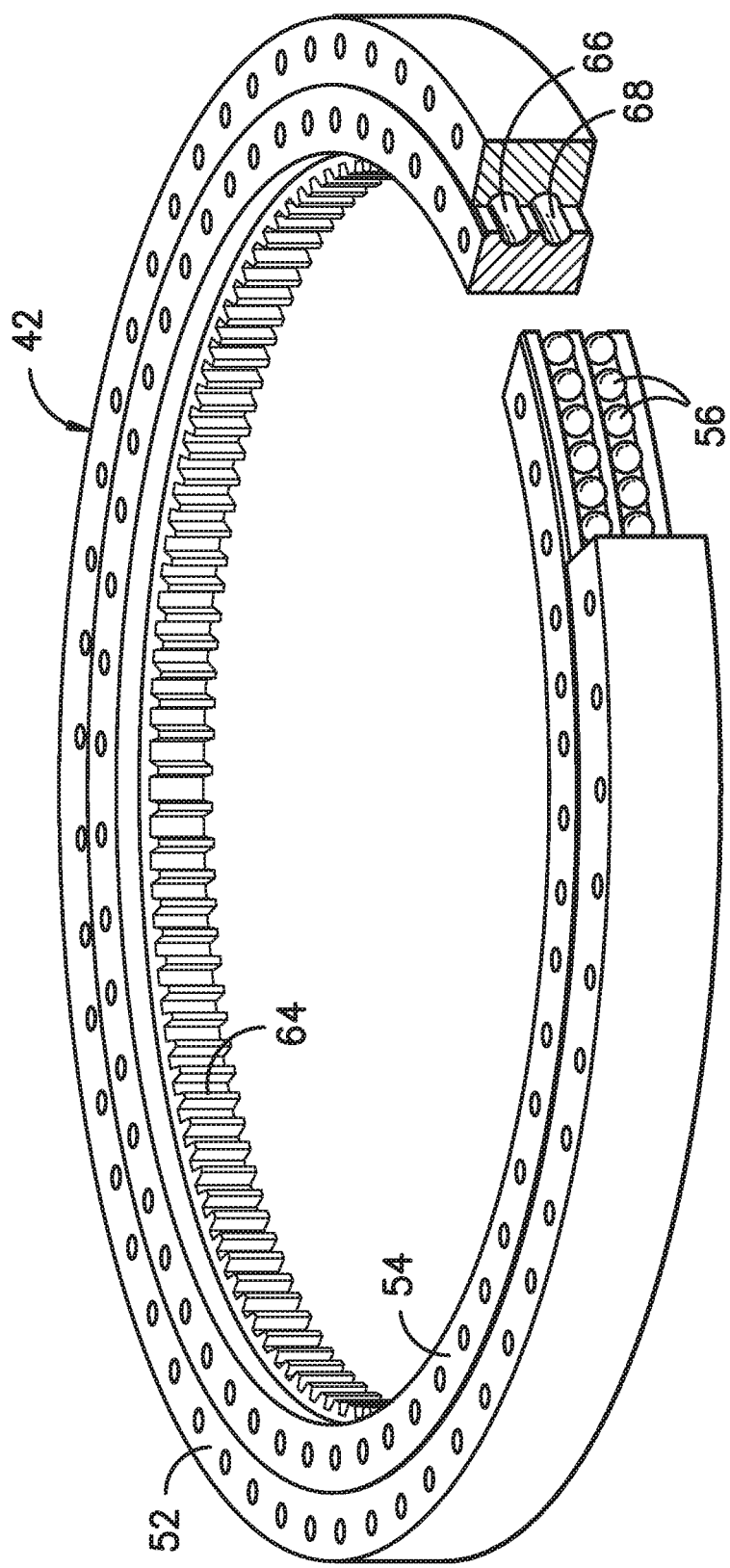
FIG. -7-

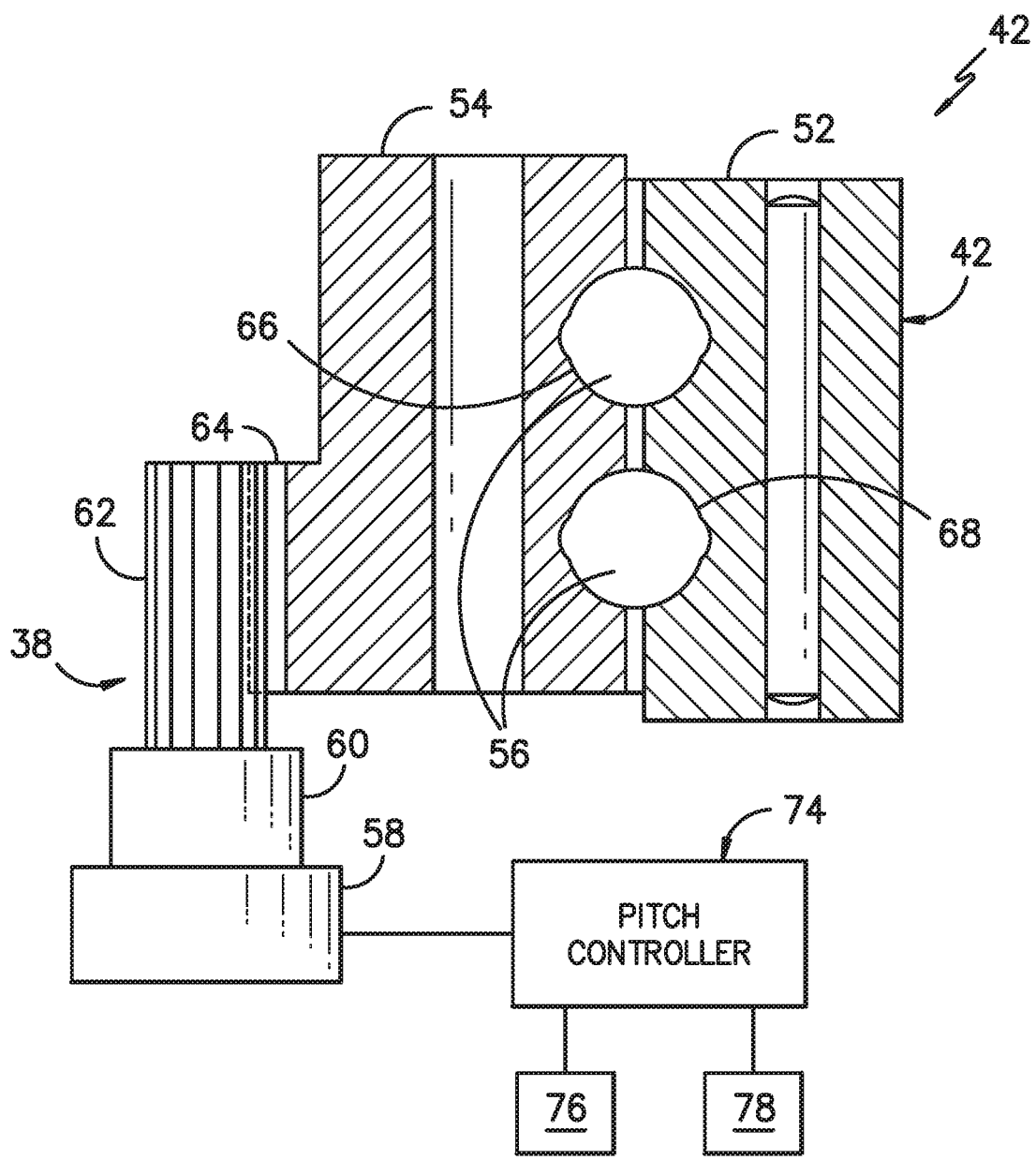
FIG. -8-

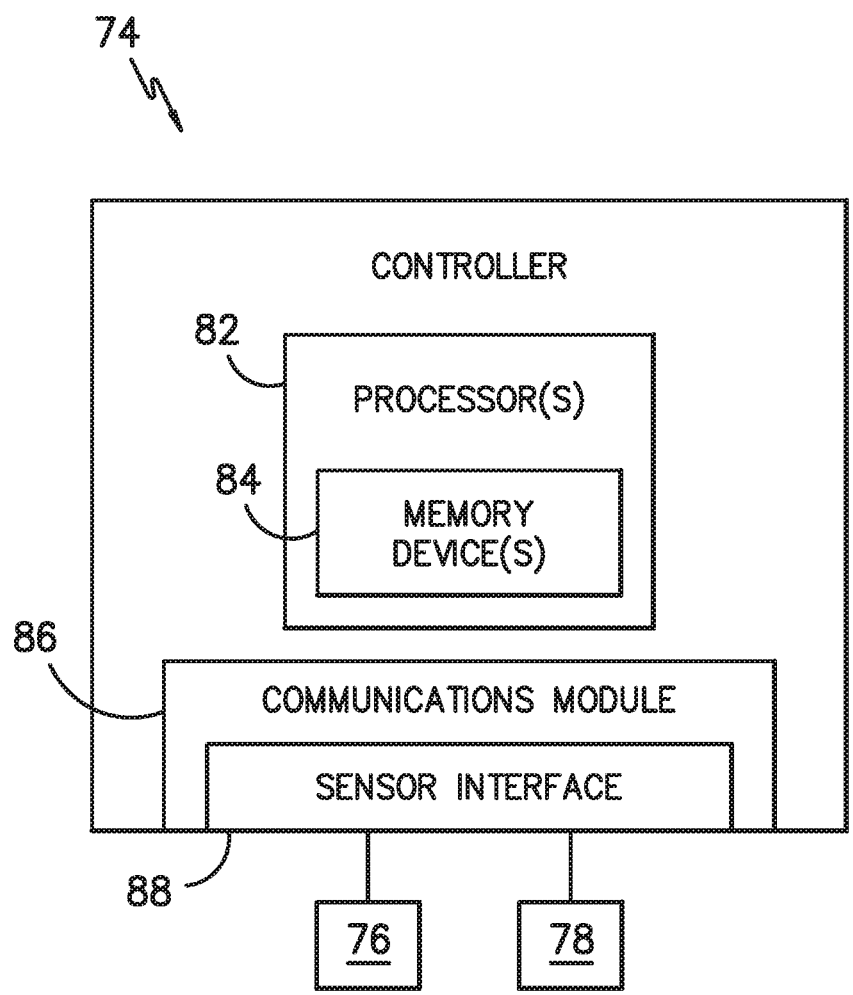
FIG. -9-

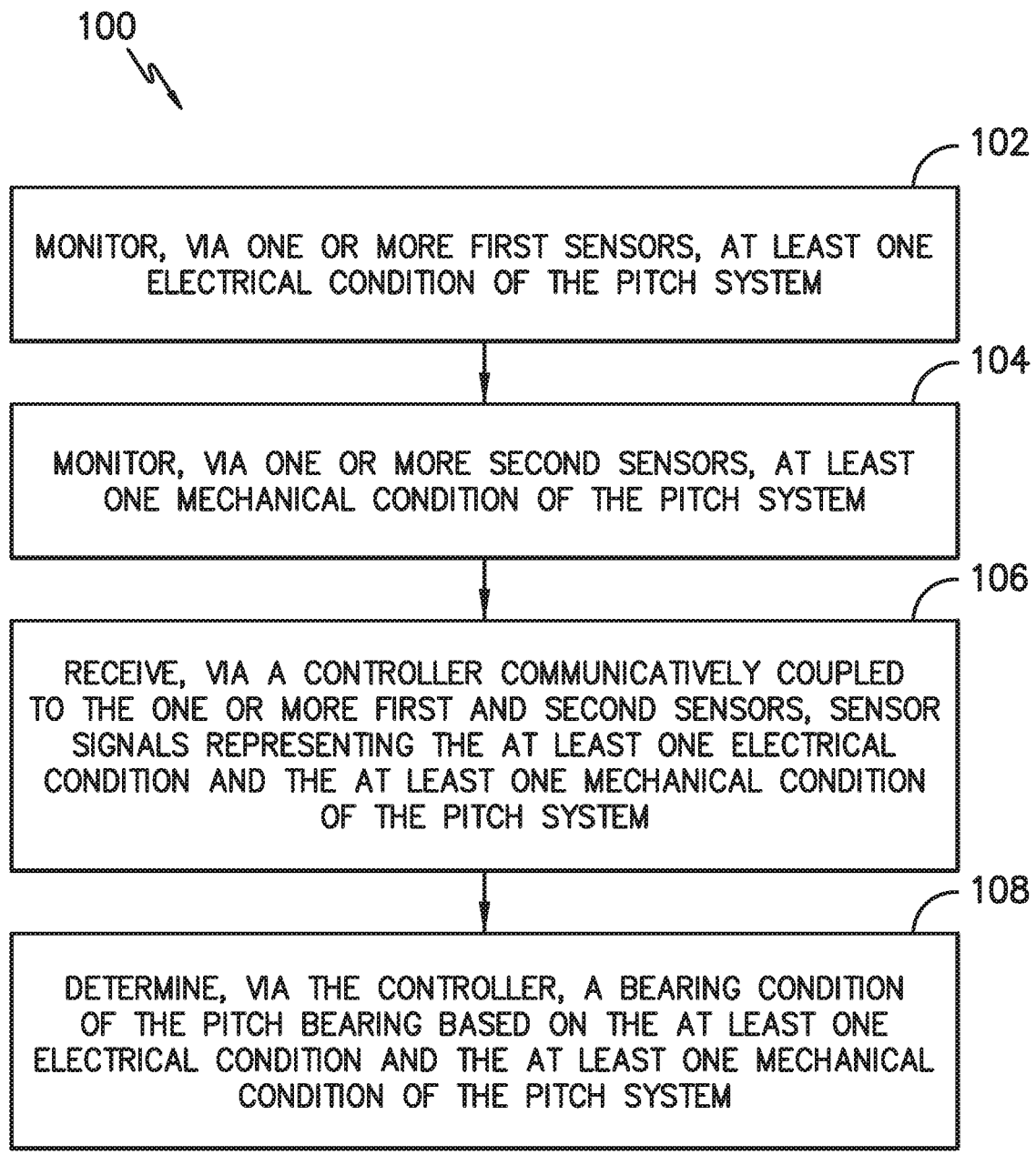
FIG. -10-

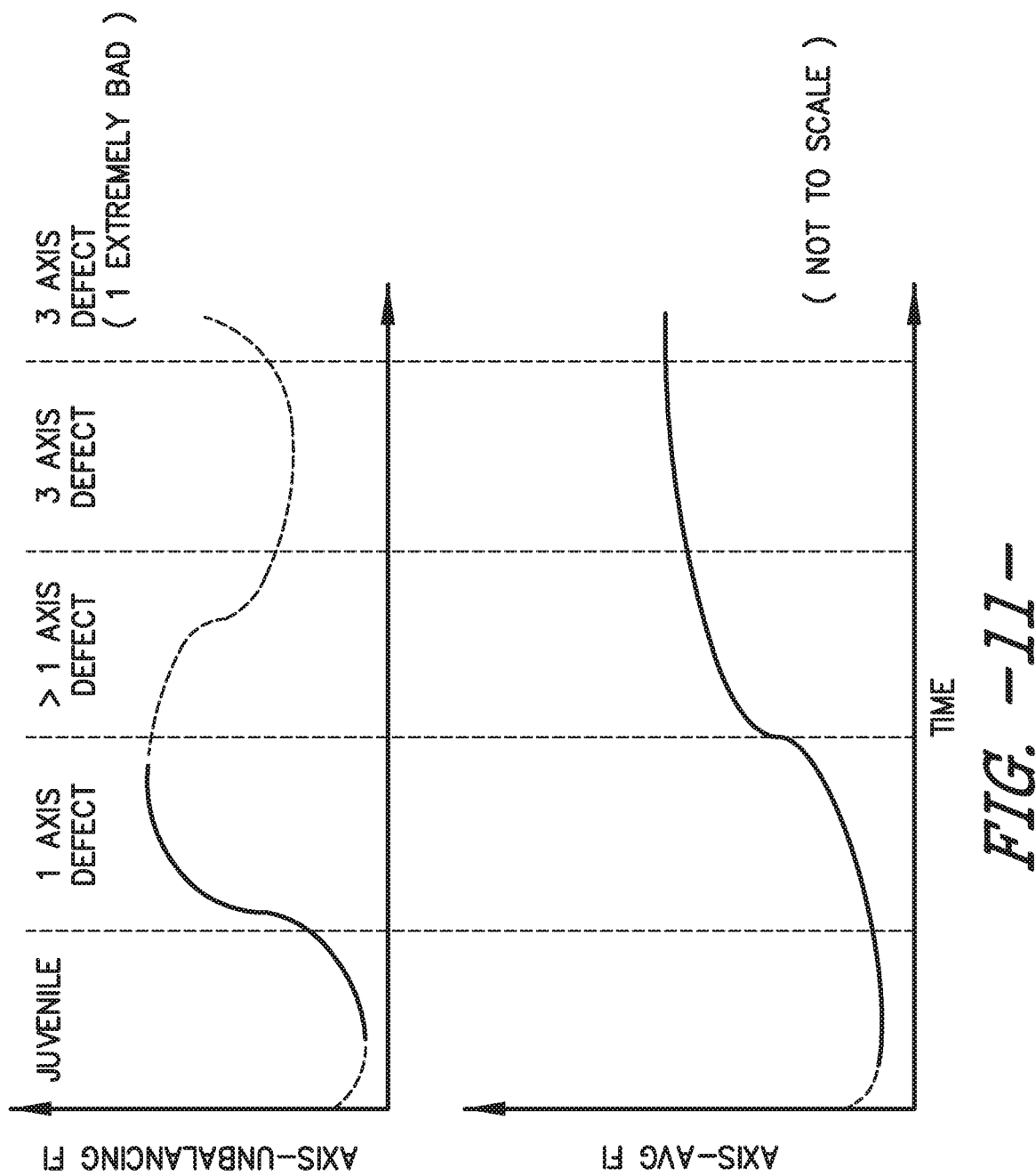

SYSTEM AND METHOD FOR MONITORING A WIND TURBINE PITCH BEARING

GOVERNMENT SUPPORT CLAUSE

This invention was made with government support under DE-EE0006802 awarded by the Department of Energy. The government has certain rights in the invention.

FIELD

The present subject matter relates generally to wind turbines and, more particularly, to systems and methods for monitoring wind turbine pitch bearings.

BACKGROUND

Wind power is considered one of the cleanest, most environmentally friendly energy sources presently available, and wind turbines have gained increased attention in this regard. A modern wind turbine typically includes a tower, a generator, an optional gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. Thus, the yaw and/or pitch bearings can be used to safely operate the wind turbine in various wind conditions and to extract the maximum amount of power under given wind conditions. The yaw and/or pitch bearings are typically slewing bearings which are rotational roller-element bearings that typically support a heavy but slow-turning or slow-oscillating load. As such, yaw bearings permit rotation of the nacelle and are mounted between the tower and the nacelle, whereas pitch bearings permit rotation of the rotor blades and are mounted between the rotatable hub and one of the rotor blades. Typical yaw and/or pitch bearings include an outer and inner race with a plurality of roller elements (e.g. ball bearings) configured between the races.

As wind turbines continue to increase in size, the slewing bearings must similarly increase in size due to increased loading. Further, in order for slewing bearings to withstand such loading, they must include various components that can adequately react to the increased loads. Thus, for example, conventional bearings typically include spacers between each of the roller elements to maintain uniform loading throughout the bearing.

Wind turbine pitch bearings are subjected to a variety of combined loading and a variety of pitching profiles. This operational characteristic creates conditions for bearing fatigue and fretting damage, as well as ball compliment migration issues. As wind conditions in the field are random in nature, it is increasingly difficult to predict the exact movement of the rolling elements, which would give significant insight to various bearing damage modes. For example, in some pitch bearings, bunching of the bearing rolling elements can add extra load or stress to the bearing cage. Eventually, the cage will break into pieces and can no longer be used to separate the rolling elements and keep their space constant. In addition to this, these broken cage pieces may be further pushed away from the raceway and even out of the bearing races.

The inspection and repair process for the pitch bearing can very complex and can take an extended amount of time to be completed if not scheduled in time. Further, such bearings are typically very expensive and can be difficult to access and replace. Thus, failure of such bearings can result in a lengthy and expensive repair process. If a monitoring technology is available that can give an early warning about the bearing condition, the repair and maintenance process can be largely improved and the downtime and related losses can be minimized.

Accordingly, improved systems and methods for monitoring the yaw and pitch bearings of the wind turbine would be welcomed in the art so as to provide an early warning about the bearing condition. Thus, the repair and maintenance process could be largely improved and the downtime and related losses can be minimized.

BRIEF DESCRIPTION

Aspects and advantages of the invention will be set forth in part in the following description, or may be obvious from the description, or may be learned through practice of the invention.

In one aspect, the present disclosure is directed to a method for monitoring a pitch system of a wind turbine. The pitch system has, at least, one pitch bearing. The method includes monitoring, via one or more first sensors, at least one electrical condition of the pitch system. The method also includes monitoring, via one or more second sensors, at least one mechanical condition of the pitch system. Further, the method includes receiving, via a controller communicatively coupled to the one or more first and second sensors, sensor signals representing the at least one electrical condition and the at least one mechanical condition of the pitch system. Thus, the method includes determining, via the controller, a bearing condition of the pitch bearing based on the at least one electrical condition and the at least one mechanical condition of the pitch system.

In another aspect, the present disclosure is directed to a wind turbine. The wind turbine includes a tower, a nacelle mounted atop the tower, and a rotor having a rotor and a rotatable hub mounted thereto. The rotatable hub has at least one rotor blade mounted thereto via a pitch system. The pitch system includes a pitch bearing communicatively coupled to a pitch controller. The pitch controller includes a monitoring system for monitoring the pitch bearing. More specifically, the monitoring system includes at least one first sensor for monitoring at least one electrical condition of the pitch system, at least one second sensor for monitoring at least one mechanical condition of the pitch system, and a controller communicatively coupled to the first and second sensors. Further, the controller is configured to receive sensor signals from the first and second sensors and determine a bearing condition of the pitch bearing based on the electrical condition(s) and the mechanical condition(s) of the pitch system.

In yet another aspect, the present disclosure is directed to a monitoring system for a bearing system of a wind turbine. The monitoring system includes at least one first sensor for monitoring at least one electrical condition of the bearing system, at least one second sensor for monitoring at least one mechanical condition of the bearing system, and a controller communicatively coupled to the at least one first and second sensors. Thus, the controller is configured to receive sensor signals from the first and second sensors and determine a bearing condition of the bearing system based on the at least one electrical condition and the at least one mechanical condition of the bearing system. In one embodiment, the bearing system may include a pitch bearing or a yaw bearing of the wind turbine.

It should be understood that the monitoring system may further include any one of combination of the features and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, internal view of one embodiment of a nacelle of the wind turbine shown in FIG. 1;

FIG. 3 illustrates a perspective view of one embodiment of one of the rotor blades of the wind turbine shown in FIG. 1;

FIG. 4 illustrates a block diagram of one embodiment of a three-axis pitch system according to the present disclosure;

FIG. 5 illustrates a graph of one embodiment of pitch angle (y-axis) versus time (x-axis) for the DC offset, 1P pitching, and 2P pitching for three rotor blades during individual pitch pitching operation according to the present disclosure;

FIG. 6 illustrates a perspective view of one embodiment of a pitch bearing of a wind turbine according to the present disclosure;

FIG. 7 illustrates a partial, cut-away view of one embodiment of a pitch bearing of a wind turbine according to the present disclosure;

FIG. 8 illustrates a schematic diagram of one embodiment of a pitch system having a monitoring system according to the present disclosure;

FIG. 9 illustrates a schematic diagram of one embodiment of a controller of a bearing assembly according to the present disclosure;

FIG. 10 illustrates a flow diagram of one embodiment of a method for monitoring a pitch system of a wind turbine according to the present disclosure; and FIG. 11 illustrates one embodiment of a signature trending curve for a pitch bearing defect according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for monitoring pitch bearing health conditions using pitch system signature analysis with both electrical signatures (e.g. pitch motor current, voltage, torque, expected pitch angle from the pitch profiler model, or one or more pitch control signals) and mechanical signatures (e.g. blade pitching angle, blade pitching speed and pitch rotor spinning speed) to increase the detectability of pitch bearing deterioration at an early stage. The quantitative relationship between mechanical and electrical signatures is derived from a physical three-axis pitch system controller model. Further, the present disclosure uses two sets of fault indicators (FIs) (i.e. a fusion of an axis-unbalancing FI and an axis-AVG FI) for the selected mechanical and electrical signatures, to increase the failure probability of detection. These fault indicators are proposed based on analyzing pitch system defect signature trending curves. The present disclosure can also be used to identify which axis fails for a detected turbine. This solution gives the operator the chance to plan the repair process before the turbine fails to avoid unnecessary downtime and financial losses. By implementing the combined fault indicator (FI) analysis, failure detection rate can be increased significantly compared to pure electrical signature analysis.

In one embodiment, the present invention compares operating data from all rotor blade axes. In another embodiment, the present invention performs the analysis on a single axis. PFA and PAA can also be applied to each axis for fault detection. In this case, the trending of the PFA and/or PAA mean value for each axis can be used as a direct indicator of the pitch bearing fault severity.

The present invention is described herein as it may relate to wind turbine bearings, including, at least, yaw bearings, pitch bearings, and/or similar. It should be appreciated, however, that the systems and methods in accordance with principles of the invention is not limited to use with a wind turbine, but is applicable to any suitable bearing application. For example, it should be understood that the systems and methods as described herein is configured to fit within conventional slewing bearings and/or modified slewing bearings known in the art and later developed and are not limited to a specific slewing bearing configuration.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). As such, it should be understood that the wind turbine 10 described herein may be an onshore or offshore wind turbine. In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Referring now to FIG. 2, a simplified, internal view of one embodiment of the nacelle 16 of the wind turbine 10 shown in FIG. 1 is illustrated. As shown, the generator 25 may be disposed within the nacelle 16 and supported atop a bedplate 36. In general, the generator 25 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 25 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 25.

The wind turbine 10 may also include a turbine controller 32 centralized within the nacelle 16. Further, as shown, the turbine controller 32 is housed within a control cabinet 34. Moreover, the turbine controller 32 may be communicatively coupled to any number of the components of the wind turbine 10 in order to control the operation of such components and/or implement various correction actions as described herein.

Referring to FIGS. 2 and 4, a typical pitch system 70 has three axis units driven by a pitch drive mechanism 38 configured to rotate each rotor blade 22 about its respective pitch axis 40 via a pitch bearing 42, thereby allowing the orientation of each blade 22 to be adjusted relative to the direction of the wind. Each pitch drive mechanism 38 includes a pitch motor 58 and regulated by its own axis controller 74 so that the rotor blades 22 can pitch individually under normal operation. It should be understood that the pitch motor 58 may be a direct current (DC) motor or an alternative current (AC) motor. Thus, when the corresponding wind generated power is beyond a threshold, individual pitch pitching control is applied to reduce the tension on the rotor blades 22 and the tower 12 during operation. For a wind turbine under individual pitch pitching control operation, as shown in FIG. 5, each axis 40 is commanded at different pitch angles at different rotor positions during individual pitch pitching operation, including 1P pitching, 2P pitching, and DC offset commands, as well as some other common offsetting terms. 1P pitching indicates that the rotor blades 22 pitch once per revolution, while 2P pitching indicates the rotor blades 22 pitch twice per revolution. The command values are updated online per the real-time measurement of the proximity probes installed on the wind turbine 10. In certain embodiments, although each rotor blade 22 is pitched individually with different loads commands, their AC command components (e.g. 1P and 2P commands) are still balanced, with the same AC magnitude but shifted 120 degrees.

Similarly, the wind turbine 10 may include one or more yaw drive mechanisms 44 communicatively coupled to the turbine controller 32, with each yaw drive mechanism(s) 44 being configured to change the angle of the nacelle 16 relative to the wind (e.g., by engaging a yaw bearing 46 of the wind turbine 10).

Referring now to FIG. 3, a perspective view of one of the rotor blades 22 shown in FIGS. 1 and 2 is illustrated in accordance with aspects of the present subject matter. As shown, the rotor blade 22 includes a blade root 23 configured for mounting the rotor blade 22 to the hub 20 and a blade tip 23 disposed opposite the blade root 23. A body 27 of the rotor blade 22 may extend lengthwise between the blade root 23 and the blade tip 24 and may generally serve as the outer shell of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 24 and a chord 39 defining the total length of the body 27 between the leading edge 33 and the trailing edge 35. As is generally understood, the chord 39 may vary in length with respect to the span 37 as the body 27 extends from the blade root 23 to the blade tip 24.

Moreover, as shown, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via one of the pitch bearings 42).

A healthy wind turbine has a balanced three-axis pitch system 70. Further, the amount of excitation required to pitch each rotor blade 22 angle is roughly the same. For a wind turbine with pitch bearing failures, the pitch motor for a damaged blade axis requires extra amount of excitation to regulate its own blade at the commanded position compared to other healthy axes. Based on these assumptions, the present disclosure is directed to a pitch bearing failure diagnostic system with a combined system-level fault indicator. The combined system-level fault indicator is composed of at least two fault indicators (FIs), which are discussed herein below.

Further, FIGS. 6-8 illustrate one embodiment of a bearing assembly 50 according to the present disclosure is illustrated. More specifically, as shown, the bearing assembly 50 includes a pitch bearing 42. It should be understood that the present disclosure is described with respect to a pitch bearing, but other bearing applications are within the spirit and scope of the invention, e.g. such as a yaw bearing. As shown, the pitch bearing 42 has outer race 52, inner bearing race 54, and a plurality of roller elements 56 disposed between the races 52, 54. As is generally understood, the outer race 52 may generally be configured to be mounted to a hub flange of the hub 20 using a plurality of hub bolts and/or other suitable fastening mechanisms. Similarly, the inner race 54 may be configured to be mounted to the blade root 23 using the root bolts 45 of the root attachment assemblies 41.

Further, the roller elements 56 as described herein may include any one of or combination of the following: one or more balls, spheres, rollers, tapered rollers, barrel-shaped rollers, cylindrical elements, or any other suitable roller elements. In addition, any suitable number of roller elements 56 may be employed. Further, the roller elements 56 may be arranged in any suitable configuration. For example, as shown in FIG. 6, two rows of roller elements 56 are employed, wherein each of the roller elements 56 is circumferentially spaced between the outer and inner races 52, 54. In still further embodiments, a single row or multiple, axially-spaced rows of roller elements 56 may be utilized in the bearing assembly 50 to provide additional strength. For example, in various embodiments, three or more rows of roller elements 56 may be employed.

Referring particularly to FIGS. 7 and 8, the roller elements 56 are configured to be received within separate raceways defined between the inner and outer races 52, 54. Specifically, a first raceway 66 is defined between the inner and outer races 52, 54 for receiving a first row of roller elements 56 and a second raceway 68 is defined between the inner and outer races 52, 54 for receiving the second row of roller elements 56. Thus, as shown in FIGS. 6, 7, and 8, the outer race 52 of the pitch bearing 42 may also include at least one ball plug 48 for allowing the roller elements 56 to be placed between the outer and inner races 52, 54 and into the raceways 66, 68. For example, as shown in FIGS. 6 and 8, the outer race 52 includes two ball plugs 48 (i.e. one for each row of roller elements 56). As such, the ball plug(s) 48 can be removed and the roller elements 56 can be inserted through the outer race 52 into one of the raceways 66, 68. In such embodiments, each raceway 66, 68 may be defined by separate walls of the outer and inner races 52, 54. For instance, as shown, the first raceway 66 is defined by a first outer raceway wall of the outer race 52 and a first inner raceway wall of the inner race 54. Similarly, the second raceway 68 is defined by a second outer raceway wall of the outer race 54 and a second inner raceway wall of the inner race 54.

As such, the inner race 54 may be configured to rotate relative to the outer race 52 (via the roller elements 56) to allow the pitch angle of each rotor blade 22 to be adjusted. As mentioned, relative rotation of the outer and inner races 52, 54 may be achieved using the pitch adjustment mechanism 38 mounted within a portion of the hub 20. In general, the pitch adjustment mechanism 38 may include any suitable components and may have any suitable configuration that allows the mechanism 38 to function as described herein. For example, as shown in FIG. 2, the pitch adjustment mechanism 38 may include a pitch drive motor 58 (e.g., an electric motor), a pitch drive gearbox 60, and a pitch drive pinion 62. In such an embodiment, the pitch drive motor 58 may be coupled to the pitch drive gearbox 60 so that the motor 58 imparts mechanical force to the gearbox 60. Similarly, the gearbox 60 may be coupled to the pitch drive pinion 62 for rotation therewith. The pinion 62 may, in turn, be in rotational engagement with the inner race 54. For example, as shown in FIG. 6, a plurality of gear teeth 64 may be formed along the inner circumference of the inner race 54, with the gear teeth 64 being configured to mesh with corresponding gear teeth formed on the pinion 62. Thus, due to meshing of the gear teeth 64 rotation of the pitch drive pinion 62 results in rotation of the inner race 54 relative to the outer race 52 and, thus, rotation of the rotor blade 22 relative to the hub 20.

Referring now to FIGS. 8 and 9, various components of a pitch system 70 that includes a monitoring system 72 according to the present disclosure are illustrated. More specifically, as shown, the pitch system 70 includes the pitch bearing 42, the pitch drive mechanism 38, first and second sensors 76, 78, and a pitch controller 74 communicatively coupled to the first and second sensor(s) 76, 78. More specifically, the first sensor(s) 76 may be configured to monitor or measure one or more electrical condition(s) of the pitch system 70, including but not limited to pitch motor current, pitch motor voltage, torque, one or more pitch control signals, or any other electrical condition(s). In another embodiment, the second sensor(s) 78 may be configured to monitor or measure the mechanical condition(s) may include pitch angle, pitching speed, pitch rotor spinning speed, or any other mechanical condition of the pitch system 70. Thus, the controller 74 is configured to receive sensor signals from the first and second sensor(s) 76, 78 and determine a bearing condition of the pitch bearing 42 based on the electrical condition(s) and the mechanical condition(s) of the pitch system 70.

In addition, as shown in FIG. 9, the controller 74 may include one or more processor(s) 82 and associated memory device(s) 84 configured to perform a variety of computer-implemented functions (e.g., performing the methods, steps, calculations and the like and storing relevant data as disclosed herein). Additionally, the controller 74 may also include a communications module 86 to facilitate communications between the controller 74 and the first and second sensor(s) 76, 78. Further, the communications module 86 may include a sensor interface 88 (e.g., one or more analog-to-digital converters) to permit signals transmitted from the first and second sensor(s) 76, 78 to be converted into signals that can be understood and processed by the processors 82. It should be appreciated that the first and second sensor(s) 76, 78 may be communicatively coupled to the communications module 86 using any suitable means. For example, as shown in FIG. 9, the first and second sensor(s) 76, 78 may be coupled to the sensor interface 88 via a wired connection. However, in other embodiments, the first and second sensor(s) 76, 78 may be coupled to the sensor interface 88 via a wireless connection, such as by using any suitable wireless communications protocol known in the art. As such, the processor(s) 82 may be configured to receive one or more signals from the first and second sensor(s) 76, 78. Further, the controller 74 and the first and second sensor(s) 76, 78 may also be an integrated packaged product, where one or more of the integrated packaged products may be utilized in the bearing assembly 50.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 82 may also be configured to compute advanced control algorithms and communicate to a variety of Ethernet or serial-based protocols (Modbus, OPC, CAN, etc.) as well as classical analog or digital signals. Additionally, the memory device(s) 84 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 84 may generally be configured to store suitable computer-readable instructions that, when implemented by the processor(s) 82, configure the controller 74 to perform the various functions as described herein.

In additional embodiments, the first and second sensor(s) 76, 78 described herein may include any one of or combination of the following sensors: proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, an optical sensor, or similar.

Referring now to FIG. 10, a flow diagram of one embodiment of a method 100 for monitoring a pitch system, e.g. such as the pitch system 70 of FIG. 7, of a wind turbine 10 is illustrated. As shown at 102, the method 100 includes monitoring, via one or more first sensors 76, at least one electrical condition of the pitch system 70. As shown at 104, the method 100 includes monitoring, via one or more second sensors 76, at least one mechanical condition of the pitch system 70. As shown at 106, the method 100 includes receiving, via the pitch controller 74, sensor signals representing the electrical condition(s) and the mechanical condition(s) of the pitch system 70. As shown at 108, the method 100 includes determining, via the controller 74, a bearing condition of the pitch bearing 42 based on the electrical condition(s) and the mechanical condition(s) of the pitch system 70. For example, in one embodiment, the controller 74 may determine the bearing condition of the pitch bearing 42 based on the electrical condition(s) and the mechanical condition(s) of the pitch system 70 by deriving a quantitative relationship between the electrical condition(s) and the mechanical condition(s) of the pitch system 70. More specifically, in such embodiments, the controller 74 may derive the quantitative relationship between the electrical condition(s) and the mechanical condition(s) from a physical three-axis pitch controller model. In further embodiments, the method 100 may also include monitoring at least one wind condition (e.g. wind speed) of the wind turbine 10. In such embodiments, the method 100 may include determining the bearing condition of the pitch bearing 42 based on the electrical condition(s), the mechanical condition(s), and the wind speed.

In additional embodiments, the controller 74 may determine one or more fault indicators (FIs) for the electrical condition(s) and the mechanical condition(s) of the pitch system 70. Such fault indicators can then be trended over time. For example, as shown in FIG. 11, a graph of one embodiment of pitch bearing defect fault indicator trending curve is illustrated, particularly illustrating a fault increasing in severity over time. Thus, in certain embodiments, the controller 74 may analyze the pitch system defect signature trending curves, which can be used to describe the life cycle of the pitch bearing 42. Thus, in such embodiments, the controller 74 may determine the fault indicator(s) for the electrical condition(s) and the mechanical condition(s) of the pitch system 70 based on the analysis. More specifically, in one embodiment, the fault indicator(s) may include an axis-unbalancing fault indicator or an axis-AVG fault indicator. Axis-unbalancing fault indicators provide a representation of the unbalancing feature of the pitch system 70 or a severity index for the system unbalancing/asymmetric features, whereas the axis-AVG fault indicators represents the average excitation level for the three-axis pitch system 70.

Further, as shown, if the pitch bearing 42 is in a healthy condition (e.g. 'Juvenile' stage in FIG. 11), the pitch motors 58 will be operating in a substantially balanced manner but shifted by 120 degrees. Therefore, the 'axis-unbalancing FI' of the system 70 formed by the three axes is negligibly small, and the 'axis-AVG FI' maintains at a reasonable and small value as well. Alternatively, if the pitch bearing 42 defect starts to develop for one axis, (e.g. '1 axis defect' stage in FIG. 11), the excitation of the motor that is driving the defective bearing will increase; therefore, the asymmetry between the pitch motors, 'axis-unbalancing FI', will increase significantly. In addition to this, the average excitation for the three-axis system, 'axis-AVG FI' goes up as well. If two or three pitch bearings 42 start to fail (e.g. '>1 axis defect', '3 axis defect', '3 axis defect (1 extremely bad)' stage in FIG. 11), the asymmetric feature of the pitch system 70, 'axis-unbalancing FI' may be mitigated compared to the previous stage; however, 'axis-AVG FI' will be increasing very fast.

If both 'axis-unbalancing' and 'axis-AVG' FIs have small numbers, the pitch system 70 is relatively healthy. If at least one FI has a high value, the wind turbine 70 can be flagged as damaged. The larger the 'axis-unbalancing FI' or 'axis-AVG FI' is, the higher the probability of a damaged pitch bearing. Practically, if at least one FI is varying from the baseline or the healthy wind pitch system by a predetermined threshold or on-line calculated amount, an alarm can be sent out.

Based on the above explanation on how to use the combined FI to detect pitch bearing failure, various software solutions can be used for validation, namely, Pitch Symmetrical-component Analysis (PSA), Pitch Fundamental-AC Analysis (PFA), and/or Pitch Angle-based Analysis (PAA). In each solution, the 'axis-unbalancing FI' and 'axis-AVG FI' are quantified by the related mechanical or/and electrical signatures respectively. PSA means that the sequence components for the pitch system 70 are used as the combined fault severity index. More precisely, the system negative sequence component of the pitch-speed-normalized motor armature current is used as 'Axis-unbalancing FI', and the positive-sequence component of the same quantity is used as 'Axis-AVG FI'. In PFA, the 'axis-unbalancing FI' is calculated from the standard deviation of the pitch-speed-normalized fundamental AC component of each pitch motor current to represent the asymmetric/unbalancing condition of the pitch system, while the 'axis-AVG FI' is computed from the three-axis mean value of the same normalized pitch current ripple quantities. PAA requires a pitch profiler model in turbine controller to provide expected pitch angle quantities as well as direct pitch angle measurement. The difference between the measured and expected angle quantities for each blade is used as the mechanical signatures. Like PFA, the 3-axis standard deviation and mean of the 'pitch angle delta' are used as the 'Axis-unbalancing FI' and 'Axis-AVG FI' respectively.

For PSA, the detection of pitch bearing defects is based on symmetrical component analysis. Symmetrical component analysis is normally used for the analysis of multi-phase AC systems. The pitch motors are single phase DC motors so symmetrical component analysis cannot be applied directly to each motor. However, AC ripples for each DC pitch motors are intentionally introduced by the given 1P pitching command and 2P pitching command during individual pitch pitching operation; a simulation analysis of the pitch system and field data shows that AC oscillations of the three separate pitch motors (one for each blade 22) together form a system that can be considered a three-phase system. Therefore, symmetrical component analysis can be applied to the three axes of the pitch system to indicate the deterioration of the pitch bearing defects.

Symmetrical component analysis can be applied to motor currents and pitch speed, or the torques and pitch speed. Usually there is no direct torque measurement available. The measurement of the motor currents is usually easier and has a higher accuracy. Thus, in one embodiment, the proposed method can be applied to motor currents and blade pitching speed. In addition, if a torque measurement is available it can be used in place of motor currents. Motor currents can be measured through an additional data acquisition system or using the pitch motor converter directly.

To perform symmetrical component analysis, the complex pitch current vector and complex pitch speed vector are calculated as follows:

$$i_{arm,xy}(t) = \left(\frac{2}{3}\right)[1 \quad \alpha \quad \alpha^2] \begin{bmatrix} i_{arm,I}(t) \\ i_{arm,II}(t) \\ i_{arm,III}(t) \end{bmatrix} \in \mathbb{C} \quad (1)$$

$$\omega_{pitch,xy}(t) = \left(\frac{2}{3}\right)[1 \quad \alpha \quad \alpha^2] \begin{bmatrix} \omega_{pitch,I}(t) \\ \omega_{pitch,II}(t) \\ \omega_{pitch,III}(t) \end{bmatrix} \in \mathbb{C} \quad (2)$$

where $\alpha = e^{\frac{2\pi}{3}j}$;

$i_{arm,I}(t)$, $i_{arm,II}(t)$, and $i_{arm,III}(t)$ are time-domain armature currents of the three pitch motors; and $\omega_{pitch,I}(t)$, $\omega_{pitch,II}(t)$, and $\omega_{pitch,III}(t)$ are the time-domain blade pitching speeds for the three blades.

The computed complex pitch current and pitch speed vectors are transferred from the time domain into the frequency domain, for example, by applying a Fast-Fourier transform (FFT) or a spectral density estimation, or real-time algorithm.

The AC positive-sequence component of the complex pitch current $i_{arm,1p}$ can be determined as the maximum Discrete Fourier Transform (DFT) bin near the pitch spinning speed (pitch system rotor speed) $\omega_{rotor}$ in the frequency spectrum. The negative sequence component of the pitch current vector $i_{arm,1n}$ can also be found as the maximum DFT bin around the negative of the AC fundamental frequency component $-\omega_{rotor}$. The positive and negative sequence components of the pitch speed, $\omega_{pitch,1p}$ and $\omega_{pitch,1n}$, can be determined in a similar manner.

For a pitch system well regulated by individual pitch pitching control, three pitch blade angles are operating in a substantially balanced manner (i.e. same AC pitching magnitude but 120-degree phase shift), no matter the system is defected or not; therefore, $\omega_{pitch,1n} \approx 0$. The symmetrical-component model for the multi-axis pitch system can be simplified as shown in equation (3).

$$\begin{cases} t_{arm,1p} = Z_{pp}\omega_{pitch,1p} + Z_{pn}\omega_{pitch,1n} \\ t_{arm,1n} = Z_{np}\omega_{pitch,1p} + Z_{nn}\omega_{pitch,1n} \end{cases} \xrightarrow{ALC:\, \omega_{pitch,1n} \approx 0} \begin{cases} t_{arm,1p} = Z_{pp}\omega_{pitch,1p} \\ t_{arm,1n} = Z_{np}\omega_{pitch,1p} \end{cases} \quad (3)$$

where, $Z_{pp}$ ($Z_{nn}$) is similar to the concept of positive (negative)-sequence impedance of an unbalanced electric circuit sequence network and represents the amount of positive(negative)-sequence current;

$I_{arm,1p}(I_{arm,1n})$ is the positive and negative sequence motor current components;

$\omega_{pitch,1p}(\omega_{pitch,1n})$ is the positive and negative sequence pitch speed components; and $Z_{pn}(Z_{np})$ is similar to transfer impedance for the same RLC electric circuit sequence network.

Ideally, if the pitch system 70 and all measurement channels are perfectly symmetric, the transfer impedances will be zero. The transfer impedance is never exactly zero, and is related to the inherent unbalance of measurement channels, the intrinsic asymmetry of the pitch system 70 and the stochastic wind condition. If the pitch system 70 has at least one pitch bearing damaged, the transfer impedance goes up significantly, and can be used as a direct index of the system unbalancing level.

With individual pitch pitching control applied, it can be observed from the simplified model in Equation (3) that $Z_{pp}$ and $Z_{pn}$, the magnitude of the positive and negative sequence components of pitch motor armature current vector normalized by $\omega_{pitch,1p}$, can directly be used as a set of combined fault indicators (FIs) to index the 'unbalancing' and 'AVG increasing' features of the multi-axis pitch systems, as shown in Equations (4) and (5).

negative sequence FI:

$$Z_{pn} = \frac{i_{arm,1n}}{\omega_{pitch,1p}} \quad (4)$$

positive sequence FI:

$$Z_{pp} = \frac{i_{arm,1p}}{\omega_{pitch,1p}} \quad (5)$$

PFA can also be applied to motor current and pitch speed, or the torque and pitch speed. Further, PFA is based on spectrum analysis for individual axis at steady state, instead of the whole three-axis system in PSA. At individual pitch pitching control steady state, a noticeable amount of AC oscillation exists in motor armature current, as well as the corresponding pitch speed and angle waveforms. The dominating AC ripples are those directly related to 1P and 2P pitching command. For simplicity, the illustrated example will focus only on the fundamental-speed component and a first axis. For the first axis, the magnitude of the fundamental AC current ripple is determined by looking at the maximum DFT bin near the rotor spinning speed $\omega_{rotor}$, and denoted as $i_{arm,I,AC1}$; the fundamental speed ripple is determined in a similarly way as $\omega_{pitch,I,AC1}$. At steady state, the current and speed ripple magnitude $i_{arm,I,AC1}$ and $\omega_{pitch,I,AC1}$ maintains.

The magnitude of the transfer function between $i_{arm,I,AC1}$ and $\omega_{pitch,I,AC1}$ (the speed-normalized fundamental current ripple), $Z_I$ represents the amount of current excitation required to pitch the blade by one unit. Similarly, the speed-normalized fundamental current ripple for rotor blades 2 and 3 are calculated and represented by $Z_{II}$ and $Z_{III}$. Given the above quantities, 'Axis-AVG FI', or the average excitation for the multi-axis system is calculated by taking the mean of $Z_I$, $Z_{II}$, and $Z_{III}$; and, 'Axis-unbalancing FI', namely the asymmetric index of the pitch system, is represented by the standard deviation of $Z_I$, $Z_{II}$, and $Z_{III}$.

Note that, like PSA, the standard deviation and mean of fundamental pitch motor current ripples alone are not accurate enough to act as the two system-severity indexes. This is because the magnitude of the commanded blade pitching speed, determined by the loads command, varies from turbine to turbine. A high mean (standard deviation) for current ripples may be purely introduced by high 1P pitching command, rather than pitch bearing failures. Therefore, it is necessary to include both pitch motor current and pitch speed to extract 'axis-unbalancing FI' and 'axis-AVG FI'.

PAA differs from PSA and PFA solutions proposed in the previous section in that only mechanical pitch angle signatures are required, and no direct measurement of motor current or torque is needed. In addition to this, the method requires a pitch profiler model to obtain an expected pitch position for each rotor blade, instead of direct measurement for blade angle only.

If raw data is acquired at steady state, the angle difference between the expected and direct measurement of each blade position (in degrees) is calculated at each sampling point as $\theta_{pitch,I,diff}(t)$, $\theta_{pitch,II,diff}(t)$, and $\theta_{pitch,III,diff}(t)$. For a well-regulated system, the pitch angle difference is negligibly small. If one blade has bearing defects, since the pitch profiler model has little knowledge on real-time pitch bearing condition, the expected blade angle is not as accurate as the healthy turbines, and the difference between the expected position and the actual measurement at each sampling point will go up significantly. To quantify the increase in pitch angle difference, root mean square (RMS) of the pitch angle difference is calculated and denoted as $\theta_{pitch,I,diff,rms}$, $\theta_{pitch,II,diff,rms}$, and $\theta_{pitch,III,diff,rms}$.

'Axis-AVG FI', or the average excitation for the multi-axis system is obtained by taking the mean of the angle difference RMS data, $\theta_{pitch,I,diff,rms}$, $\theta_{pitch,II,diff,rms}$, and $\theta_{pitch,III,diff,rms}$; 'Axis-unbalancing FI', namely the asymmetric index of the pitch system, is represented by the standard deviation of the same set of RMS data, $\theta_{pitch,I,diff,rms}$, $\theta_{pitch,II,diff,rms}$, and $\theta_{pitch,III,diff,rms}$. In fact, not only the RMS, but also the DC, fundamental AC, and second harmonic AC components of the pitch angle difference have been calculated for field data validation.

In certain embodiments, the derived FI quantities may also be averaged for a given period (e.g. a few weeks) or a selected number of files (e.g. 20 files), to get a more robust and reliable ranking fleet or decision on pitch bearing condition.

The proposed pitch bearing fault detection solutions are all physical-model based, which require the knowledge of a general steady-state DC pitch motor model and a general multi-phase AC system sequence model; although no model parameters are required. It will not only indicate which wind turbine has pitch bearing failure, but also indicates which one of the three axes for that turbine is defected. For computation complexity point of view, it is observed that PAA focuses on time domain RMS calculation only, so the computation requirement for PAA is minimal; PSA requires symmetrical component analysis and frequency decomposition for system quantity only, therefore the computation complexity is a little high; PFA requires spectrum analysis for each axis variables, which means the computation complexity is highest among all three. On the other side, PAA requires the knowledge of the pitch profiler model, which may not available for all wind turbines. If not available, only PSA and PFA can be applied to diagnose pitch bearing failures.

In several embodiments, if the determined bearing condition indicates that the pitch bearing 42 is damaged, the method 100 may further include identifying an axis of the damaged pitch bearing 42. Thus, an operator can plan to repair the damaged pitch bearing before the wind turbine fails to avoid unnecessary downtime and energy losses. For example, in one embodiment, the method 100 may include scheduling maintenance on the damaged pitch bearing 42 at a later time but before the pitch bearing 42 fails. Thus, in particular embodiments, by combining electrical and mechanical, the present disclosure provides improved detection accuracy, trending, and severity assessment of the pitch system 70 and associated rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring a pitch system of a wind turbine, the pitch system having, at least, a pitch bearing, the method comprising:
    monitoring, via one or more first sensors, at least one electrical condition of the pitch system, the at least one electrical condition comprising at least one of pitch motor current, pitch motor voltage, or torque;
    monitoring, via one or more second sensors, at least one mechanical condition of the pitch system;
    receiving, via a controller communicatively coupled to the one or more first and second sensors, sensor signals representing the at least one electrical condition and the at least one mechanical condition of the pitch system; and
    determining, via the controller, an axis-unbalancing fault indicator and an axis-average fault indicator for the pitch bearing based on the at least one electrical condition and the at least one mechanical condition of the pitch system via a Pitch Symmetrical-component Analysis, wherein the axis-unbalancing fault indicator is a system negative sequence component of a pitch-speed-normalized motor armature current, and wherein the axis-average fault indicator is a positive-sequence component of the same pitch-speed-normalized motor armature current.

2. The method of claim 1, wherein the at least one mechanical condition comprises at least one of pitch angle, pitching speed, or pitch rotor spinning speed.

3. The method of claim 1, further comprising monitoring a wind speed of the wind turbine and determining the axis-unbalancing fault indicator and the axis-average fault indicator for the pitch bearing based on the at least one electrical condition, the at least one mechanical condition of the pitch system, and the wind speed.

4. The method of claim 1, wherein determining the axis-unbalancing fault indicator and the axis-average fault indicator for the pitch bearing based on the at least one electrical condition and the at least one mechanical condition of the pitch system further comprises:
    deriving a quantitative relationship between the at least one electrical condition and the at least one mechanical condition of the pitch system.

5. The method of claim 4, further comprising deriving the quantitative relationship between the at least one electrical condition and the at least one mechanical condition of the pitch system from a physical three-axis pitch controller model.

6. The method of claim 1, wherein determining the axis-unbalancing fault indicator and the axis-average fault indicator further comprises:
    analyzing one or more pitch system defect signature trending curves; and
    determining the axis-unbalancing fault indicator and the axis-average fault indicator based on the analysis.

7. A method for monitoring a pitch system of a wind turbine, the pitch system having, at least, a pitch bearing, the method comprising:

monitoring, via one or more first sensors, at least one electrical condition of the pitch system, the at least one electrical condition comprising at least one of pitch motor current, pitch motor voltage, or torque;

monitoring, via one or more second sensors, at least one mechanical condition of the pitch system;

receiving, via a controller communicatively coupled to the one or more first and second sensors, sensor signals representing the at least one electrical condition and the at least one mechanical condition of the pitch system; and determining, via the controller, an axis-unbalancing fault indicator and an axis-average fault indicator for the pitch bearing based on the at least one electrical condition and the at least one mechanical condition of the pitch system via a Pitch Fundamental-AC Analysis, wherein the Pitch Fundamental-AC Analysis comprises:

determining a standard deviation of a pitch-speed-normalized fundamental AC component of the pitch motor current for each pitch motor, wherein the standard deviation represents an unbalancing condition of the pitch system and is the axis-unbalancing fault indicator, and determining a three-axis mean value of the pitch-speed-normalized fundamental AC component of the pitch motor current for each pitch motor, wherein the three-axis mean value is the axis-average fault indicator.

8. The method of claim 7, wherein the at least one mechanical condition comprises at least one of pitch angle, pitching speed, or pitch rotor spinning speed.

9. The method of claim 7, further comprising monitoring a wind speed of the wind turbine and determining the axis-unbalancing fault indicator and the axis-average fault indicator for the pitch bearing based on the at least one electrical condition, the at least one mechanical condition of the pitch system, and the wind speed.

10. The method of claim 7, wherein determining the axis-unbalancing fault indicator and the axis-average fault indicator for the pitch bearing based on the at least one electrical condition and the at least one mechanical condition of the pitch system further comprises:

deriving a quantitative relationship between the at least one electrical condition and the at least one mechanical condition of the pitch system.

11. The method of claim 10, further comprising deriving the quantitative relationship between the at least one electrical condition and the at least one mechanical condition of the pitch system from a physical three-axis pitch controller model.

12. The method of claim 7, wherein determining the axis-unbalancing fault indicator and the axis-average fault indicator further comprises:

analyzing one or more pitch system defect signature trending curves; and determining the axis-unbalancing fault indicator and the axis-average fault indicator based on the analysis.

* * * * *